US012801960B2

(12) United States Patent
Morita

(10) Patent No.: US 12,801,960 B2
(45) Date of Patent: Nov. 17, 2026

(54) STORAGE MEDIUM, QUANTUM CALCULATION CONTROL METHOD, AND INFORMATION PROCESSING DEVICE

(71) Applicant: FUJITSU LIMITED, Kawasaki (JP)

(72) Inventor: Mikio Morita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 764 days.

(21) Appl. No.: 18/191,021

(22) Filed: Mar. 28, 2023

(65) Prior Publication Data

US 2023/0244976 A1 Aug. 3, 2023

Related U.S. Application Data

(63) Continuation of application No. PCT/JP2020/043304, filed on Nov. 20, 2020.

(51) Int. Cl.
*G06N 10/20* (2022.01)

(52) U.S. Cl.
CPC .................................... *G06N 10/20* (2022.01)

(58) Field of Classification Search
None
See application file for complete search history.

(56) References Cited

U.S. PATENT DOCUMENTS

2010/0299509 A1 11/2010 Doi et al.
2011/0145366 A1 6/2011 Krishnamurthy et al.
2013/0151174 A1 6/2013 Kusakabe et al.
2018/0096085 A1 4/2018 Rubin
2020/0057957 A1 2/2020 Johnson et al.

FOREIGN PATENT DOCUMENTS

CA 3137475 11/2020
JP 2010-271755 A 12/2010
(Continued)

OTHER PUBLICATIONS

Bharti K, Cervera-Lierta A, Kyaw TH, Haug T, Alperin-Lea S, Anand A, Degroote M, Heimonen H, Kottmann JS, Menke T, Mok WK. Noisy intermediate-scale quantum algorithms. Reviews of Modern Physics. Jan. 1, 2022; 94(1):015004.) (Year: 2022).*
(Continued)

*Primary Examiner* — Vincent Gonzales
(74) *Attorney, Agent, or Firm* — Fujitsu Intellectual Property Center

(57) ABSTRACT

A non-transitory computer-readable storage medium storing a quantum calculation control program that causes at least one computer to execute a process, the process includes causing a first quantum calculator among a plurality of quantum calculators that calculate a quantum state of a system to repeat calculation of the quantum state under a first calculation condition a first number of times; acquiring first energy of the system, based on the information and a result of the calculation of the first quantum calculator for a second number of times less than the first number of times; and causing a second quantum calculator among the plurality of quantum calculators to start calculation of the quantum state under a second calculation condition determined based on the first energy, during the calculation under the first calculation condition.

9 Claims, 11 Drawing Sheets

(56) References Cited

FOREIGN PATENT DOCUMENTS

| | | |
|---|---|---|
| JP | 2013-513875 A | 4/2013 |
| WO | 2012/023563 A1 | 2/2012 |

OTHER PUBLICATIONS

Cerezo M, Sharma K, Arrasmith A, Coles PJ. Variational quantum state eigensolver. npj Quantum Information. Sep. 21, 2022;8(1):113. (Year: 2022).*

Wang, Daochen et al., "Accelerated Variational Quantum Eigensolver", arxiv.org, Cornell University Library, 201 Olin Library Cornell University Ithaca, NY 14853, Mar. 25, 2019, pp. 1-11, XP081127547.

Extended European Search Report dated Nov. 13, 2023 for corresponding European Patent Application No. 20962461.8. *Please note US-2020/0057957-A1 cited herewith, was previously cited in an IDS filed on Mar. 28, 2023.*

Leo Zhou et al., "Quantum Approximate Optimization Algorithm: Performance, Mechanism, and Implementation on Near-Term Devices", The American Physical Society(APS), Physical Review X 10, 021067 (2020), pp. 021067-1-021067-23, Jun. 24, 2020, DOI: 10.1103/PhysRevX.10.021067 [Retrieved on Feb. 3, 2021] [online] https://journals.aps.org/prx/pdf/10.1103/PhysRevX.10.021067 (Total 24 pages) (Cited in ISR).

International Search Report and Written Opinion of the International Searching Authority (Form PCT/ISA/210, 220, and 237), mailed in connection with PCT/JP2020/043304 and mailed Feb. 16, 2021 (Total 10 pages).

Chinese Office Action mailed Mar. 1, 2025 for corresponding Chinese Office Patent Application No. 202080106206.6, with English Translation, 14 pages. *Please note CA-3137475-A1 cited herewith, was previously cited in an IDS filed on Dec. 19, 2023.*

European Office Action dated Jan. 23, 2025 for corresponding European Patent Application No. 20962461.8, 8 pages. *Please note CA-3137475-A1 and US-2018/096085-A1 cited herewith, was previously cited in an IDS filed Dec. 19, 2023.*

* cited by examiner

STORAGE MEDIUM, QUANTUM CALCULATION CONTROL METHOD, AND INFORMATION PROCESSING DEVICE

CROSS-REFERENCE TO RELATED APPLICATION

This application is a continuation application of International Application PCT/JP2020/043304 filed on Nov. 20, 2020 and designated the U.S., the entire contents of which are incorporated herein by reference.

FIELD

The present invention relates to a storage medium, a quantum calculation control method, and an information processing device.

BACKGROUND

A noisy intermediate-scale quantum computer (NISQ) has been proposed as a medium-scale quantum computer (the number of quantum bits is about several hundreds) that does not have an error-correcting function, instead of a quantum computer having an error-correcting function, which is thought to take a long time to be put into practical use. NISQ is believed to be feasible within a few years to a decade or so.

One of the use applications of NISQ is quantum chemical calculations (see Patent Document 1, for example). Quantum chemical calculations are calculations to obtain information regarding the properties of molecules and substances in a system, by solving the Schrödinger equation, $H|\psi\rangle=E|\psi\rangle$. A Hamiltonian is denoted by H and is defined by interatomic distances, intermolecular distances, and the like. The quantum state of the system is denoted by $|\psi\rangle$ and is sometimes called the state vector (or simply the state). The energy of the system is denoted by E.

Calculation of the above Schrödinger equation can be considered as calculation of an eigenvalue problem. In other words, finding the eigenvalue (energy) and the corresponding eigenvector (state vector) corresponds to solving the Schrödinger equation. Since most systems are in the lowest energy state, quantum chemical calculations often search for the lowest energy (ground energy) and the quantum state (ground state) corresponding to the lowest energy (ground energy).

The variational quantum eigensolver (VQE) is known as an algorithm for searching for such ground energy and ground state using both of a quantum computer and a classical computer. In VQE, θ, which is an optimization variable (a variable used for quantum gate manipulation) set in the quantum computer, is varied, the classical computer calculates the energy based on the quantum states obtained for each θ, and the ground energy and the ground state are searched for.

Patent Document 1: International Publication Pamphlet No. WO 2012/023563, Patent Document 2: Japanese Laid-open Patent Publication No. 2010-271755, and Patent Document 3: Japanese National Publication of International Patent Application No. 2013-513875.

SUMMARY

According to an aspect of the embodiments, a non-transitory computer-readable storage medium storing a quantum calculation control program that causes at least one computer to execute a process, the process includes causing a first quantum calculator among a plurality of quantum calculators that calculate a quantum state of a system to repeat calculation of the quantum state under a first calculation condition a first number of times; acquiring first energy of the system, based on the information and a result of the calculation of the first quantum calculator for a second number of times less than the first number of times; and causing a second quantum calculator among the plurality of quantum calculators to start calculation of the quantum state under a second calculation condition determined based on the first energy, during the calculation under the first calculation condition.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In quantum calculations such as quantum chemical calculations as described above, many iterative calculations are performed for each calculation condition (θ in the case of the above example) in order to obtain calculation results with the demanded calculation accuracy. Therefore, there is a problem that long calculation time is taken.

In one aspect, the present invention aims to reduce calculation time in quantum calculations.

In one aspect, the present invention may reduce calculation time in quantum calculations.

The above-described object and other objects, features, and advantages of the present invention will become clear from the following description related to the appended drawings, which represents preferred embodiments as examples of the present invention.

Hereinafter, modes for carrying out the invention will be described with reference to the drawings.

First Embodiment

Figure 1:
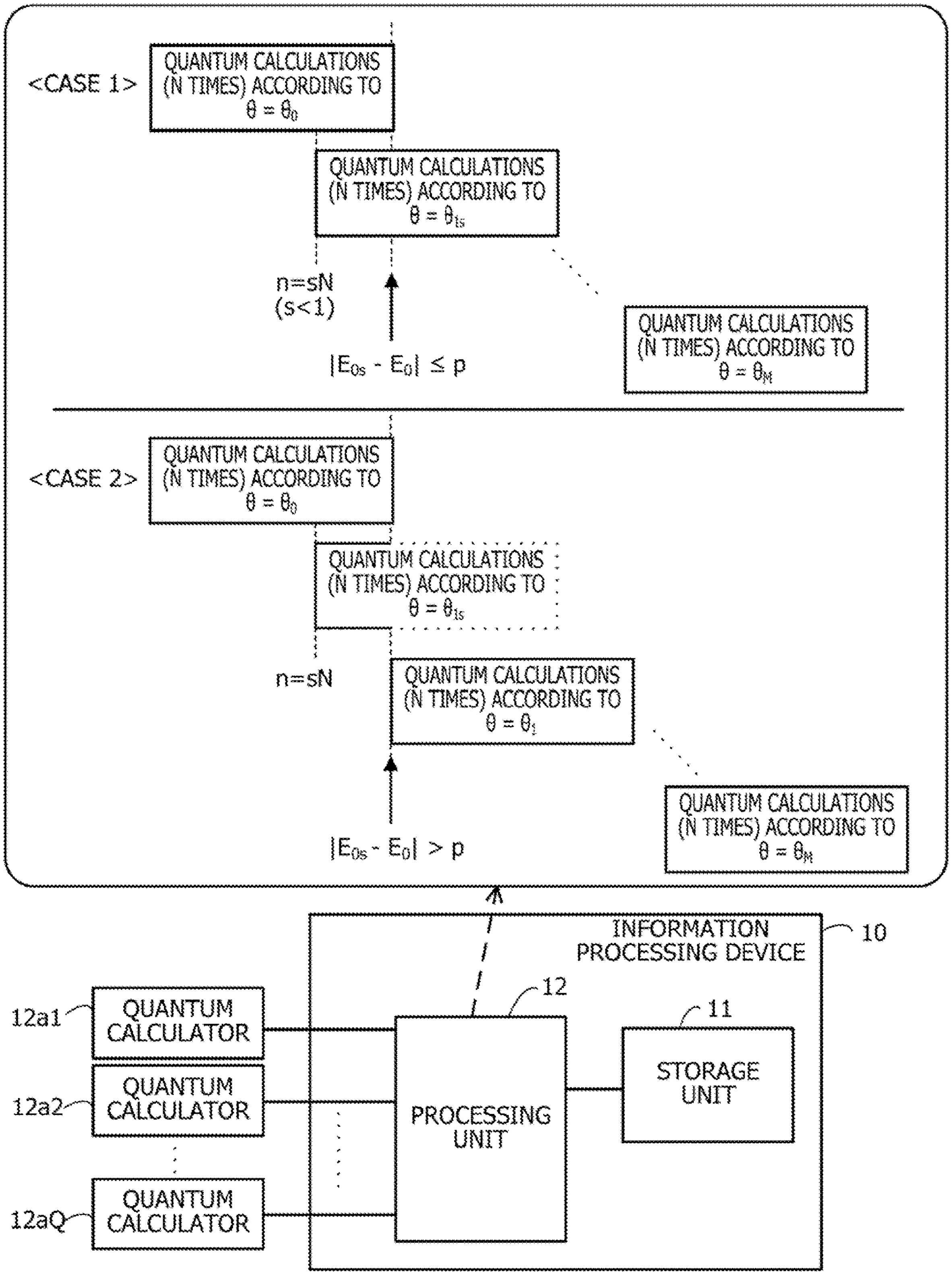
FIG. 1 is a diagram illustrating an example of a quantum calculation control method and an information processing device according to a first embodiment.

FIG. 1 is a diagram illustrating an example of a quantum calculation control method and an information processing device according to a first embodiment.

An information processing device 10 of the first embodiment controls a plurality of quantum calculators 12*a*1, 12*a*2, . . . , and 12*a*Q to calculate (search for) the ground energy and the ground state of a system.

For example, for the quantum calculators 12*a*1 to 12*a*Q, a variety of quantum calculators can be applied, such as those based on superconducting quantum bits and those using diamond color centers as quantum bits.

Each of the quantum calculators 12*a*1 to 12*a*Q calculates the quantum state of the system subject to calculation, according to the calculation conditions set by the information processing device 10. For example, each of the quantum calculators 12*a*1 to 12*a*Q performs predetermined quantum calculations (quantum manipulations) on a plurality of quantum bits according to the set calculation condition. The values of the plurality of quantum bits measured after quantum calculations are treated as the quantum states of the system as calculation results. The system subject to calculation is a system including a plurality of atoms or molecules when quantum chemical calculations are performed as quantum calculations.

When quantum calculations by VQE are performed, the energy of the system is represented by following formula (1).

[Mathematical Formula 1]

$$E = \frac{\langle \psi(\vec{\theta}) | H | \psi(\vec{\theta}) \rangle}{\langle \psi(\vec{\theta}) | \psi(\vec{\theta}) \rangle} \tag{1}$$

In formula (1), θ (expressed as a vector) denotes an optimization variable and represents calculation conditions for the quantum calculators 12*a*1 to 12*a*Q. For example, a parameter that defines the angle of quantum manipulation (spin rotation manipulation) for the quantum bit is denoted by θ. The quantum state of the system obtained by quantum manipulation is indicated by ψ(θ). A Hamiltonian is denoted by H. In quantum chemical calculations, the Hamiltonian reflects the magnitude of the Coulomb interaction between electron atoms and the Coulomb interaction between electrons and is defined by interatomic distances or intermolecular distances (hereinafter referred to as R) or the like. The quantum state that minimizes the energy when θ and R are varied is the ground state (or a state close to the ground state) desired to be found, and the energy at that time is the ground energy (or energy close to the ground energy).

The information processing device 10 includes a storage unit 11 and a processing unit 12.

The storage unit 11 is a volatile storage device such as a random access memory (RAM) or a nonvolatile storage device such as a hard disk drive (HDD) or a flash memory. The storage unit 11 stores information on the system subject to calculation used for quantum calculations. For example, the storage unit 11 stores parameters for representing the Hamiltonian of the system, information on the demanded calculation accuracy, and the like.

The processing unit 12 is achieved by a processor that is hardware such as a central processing unit (CPU) or a digital signal processor (DSP). However, the processing unit 12 may include an electronic circuit for a specific application, such as an application specific integrated circuit (ASIC) or a field programmable gate array (FPGA). The processor executes a program stored in a memory such as a RAM. For example, a quantum calculation control program is executed. Note that a set of a plurality of processors will be sometimes referred to as a "multiprocessor" or simply a "processor".

The processing unit 12 performs processes as follows.

The processing unit 12 causes a first quantum calculator among the quantum calculators 12*a*1 to 12*a*Q that calculate the quantum state of the system subject to calculation to repeat calculations of the quantum state under a first calculation condition a first number of times (hereinafter, N times). For example, the processing unit 12 sets $\theta=\theta_0$ as an example of the first calculation condition in the quantum calculator 12*a*1, as in FIG. 1, and causes the quantum calculator 12*a*1 to perform calculations of the quantum state (quantum calculations) N times.

In addition, the processing unit 12 calculates first energy of the system, based on the calculation results of the first quantum calculator for a second number of times (hereinafter, sN times) less than the N times, and information on the system (information on the Hamiltonian). The speculative execution ratio is denoted by s and has a value less than one. For example, the processing unit 12 calculates the energy as follows, based on the quantum states (quantum states for the sN times) obtained by each quantum calculation when causing the quantum calculator 12*a*1 to perform quantum calculations according to $\theta=\theta_0$ sN times.

In formula (1), H can be represented as formula (2) below.

[Mathematical Formula 2]

$$H = \sum_i h_i O_i \tag{2}$$

In formula (2), the tensor product of Pauli matrices that perform quantum manipulation is denoted by $O_i$. The Pauli matrices are also called Pauli operators and have four matrices of X, Y, Z, and I (identity matrix). The storage unit 11 stores $h_i$, which is a real number coefficient, for each R in advance. An integer from one to L is denoted by i. That is, H can be represented by the sum of L number of $h_iO_i$. For example, L is designated depending on the type of molecule and the basis function used for calculation.

The energy for certain θ can be represented as formula (3) below.

[Mathematical Formula 3]

$$E = \sum_i h_i \langle \psi(\theta) | O_i | \psi(\theta) \rangle \tag{3}$$

Here, assuming that $p_0$ is the probability that the number of quantum bits in a state |1> in the quantum calculation per one time is an even number, and $p_1$ is the probability that the above number of quantum bits is an odd number, each of $p_0$ and $p_1$ can be represented as formula (4) below.

[Mathematical Formula 4]

$$p_0 = \frac{1 + \langle\psi(\theta)\,|\,O_i\,|\,\psi(\theta)\rangle}{2},\ p_1 = \frac{1 - \langle\psi(\theta)\,|\,O_i\,|\,\psi(\theta)\rangle}{2} \quad (4)$$

That is, $\langle\psi(\theta)|O_i|\psi(\theta)\rangle$ can be represented, for example, as formula (5) below.

[Mathematical Formula 5]

$$\langle \psi(\theta)|O_i|\psi(\theta)\rangle = 2p_0 - 1 \quad (5)$$

When $p_0$ for the measurement of the tensor product $O_i$ is replaced with $p_{i0}$, formula (3) can be represented as formula (6) below.

[Mathematical Formula 6]

$$E = \sum_i h_i(2p_{i0} - 1) \quad (6)$$

That is, E can be worked out by finding $p_{i0}$. Note that E can also be calculated by finding $p_1$ that the number of quantum bits in the state $|1\rangle$ is an odd number.

The processing unit 12 calculates $p_{i0}$ based on the calculation results for the number of calculations of sN times (n=sN) and uses $p_{i0}$ to calculate $E_{0s}$, which is an example of the first energy, as E from formula (6).

Furthermore, during the quantum calculations by the first quantum calculator, the processing unit 12 also causes a second quantum calculator among the quantum calculators 12*a*1 to 12*a*Q to start quantum calculations under a second calculation condition designated based on the first energy. For example, the processing unit 12 causes the quantum calculator 12*a*2 to start quantum calculations under $\theta=\theta_{1s}$, which is an example of the second calculation condition designated based on the calculated $E_{0s}$, during quantum calculations by the quantum calculator 12*a*1.

Based on $E_{0s}$, for example, the processing unit 12 uses simultaneous perturbation stochastic approximation, sequential quadratic programming, or the like to designate $\theta_{1s}$ such that the energy becomes smaller.

In addition, the processing unit 12 calculates second energy of the system, based on the calculation results of the first quantum calculator for the N times and information on the system (information on the Hamiltonian). For example, the processing unit 12 calculates above $p_{i0}$ based on the calculation results for the N times (quantum states for the N times) by the quantum calculator 12*a*1 and uses $p_{i0}$ to calculate $E_0$, which is an example of the second energy, as E from formula (6). Since $E_0$ is energy obtained based on the results of more quantum calculations than $E_{0s}$, the calculation accuracy of $E_0$ is higher than the calculation accuracy of $E_{0s}$.

Then, the processing unit 12 designates whether or not to cause the second quantum calculator to execute quantum calculations under a third calculation condition different from the second calculation condition, according to whether or not the difference between the first energy and the second energy is equal to or less than a predetermined value (p).

For example, when $|E_{0s}-E_0|$, which is the difference between $E_{0s}$ and $E_0$, is equal to or less than p, in other words, when $|E_{0s}-E_0|\leq p$ is met (case 1 in FIG. 1), the processing unit 12 causes the quantum calculator 12*a*2 to continue quantum calculations under the second calculation condition ($\theta=\theta_{1s}$). For example, the final demanded calculation accuracy input by a user is denoted by p. When quantum chemical calculations are performed, for example, $1.6\times10^{-3}$ hartree is used as p.

On the other hand, when $|E_{0s}-E_0|$ is greater than p, in other words, when $|E_{0s}-E_0|>p$ is met (case 2 in FIG. 1), the processing unit 12 causes the quantum calculator 12*a*2 to execute quantum calculations under the third calculation condition. In this case, in the quantum calculator 12*a*2, quantum calculations under the second calculation condition are suspended, and quantum calculations under the third calculation condition ($\theta=\theta_1$) are started. The third calculation condition is designated by a method similar to the above method for the second calculation condition, based on the second energy.

The processing unit 12 repeats the processes as described above for other calculation conditions. The energy obtained by such processes converges toward the ground energy. The processing unit 12 outputs, for example, the energy of the system obtained after quantum calculations have been executed for predetermined types of calculation conditions, and the applied calculation condition (θ), as a calculation result (search result). In the example in FIG. 1, the last applied calculation condition is denoted by $\theta=\theta_M$. Note that, when quantum chemical calculations are performed, each R is processed as described above.

The processing unit 12 may output the calculation result to a display device (not illustrated) for display, or may output the calculation result to a device external to the information processing device 10. In addition, the processing unit 12 may store the calculation result in the storage unit 11.

Note that, when a predetermined convergence condition (for example, the energy fluctuation amount is within a predetermined range) is satisfied, the processing unit 12 may terminate the process without causing quantum calculations to be executed under a new calculation condition.

In the quantum calculation control method of the first embodiment as described above, the information processing device 10 causes the first quantum calculator to repeatedly calculate the quantum state of the system under the first calculation condition and causes the second quantum calculator to start the calculations under the second calculation condition based on the first energy obtained during the calculations of the first quantum calculator. This ensures quantum calculations to be performed in parallel under a plurality of calculation conditions and thereby reduces the calculation time.

In addition, the information processing device 10 calculates the second energy of the system, based on the quantum state obtained by calculations for the N times by the first quantum calculator, and the information on the system. Then, when the difference between the first energy and the second energy is greater than p, the information processing device 10 causes the second quantum calculator to suspend quantum calculations under the second calculation condition and start quantum calculations under the third calculation condition designated based on the second energy. As described above, since $E_0$, which is an example of the second energy, is energy obtained based on the results of more quantum calculations than $E_{0s}$, which is an example of the first energy, the calculation accuracy of $E_0$ is higher than the calculation accuracy of $E_{0s}$. Therefore, by performing quantum calculations under the third calculation condition designated based on the second energy, degradation in calculation accuracy may be suppressed.

The above processing is a kind of speculative processing (hereinafter referred to as speculative processing), but differs from existing speculative processing in the following points.

In the existing speculative processing, the result of the processing in the previous stage is referred to as an input as a verification material for the speculative processing. For example, when a certain branching process (if statement) has often been determined to be true so far, the process is speculatively performed on the supposition that the certain branching process will be true this time as well.

In contrast to this, in the quantum calculation control method of the first embodiment described above, the input (calculation condition) for the next stage of iterative calculations is obtained from the result obtained during the iterative calculations under a certain calculation condition. In VQE, the calculation accuracy is on the order of $1/\sqrt{n}$ with respect to a variable n indicating the number of calculations of iterative calculations, and as for the results obtained during iterative calculations, correct results to some extent are often obtained. Therefore, such speculative processing is acceptable.

Note that the smaller the speculative execution ratio s, the more quantum calculators are used, and the number of parallel calculations increases accordingly, and it is expected that the calculation time will be further reduced.

Second Embodiment

Next, a second embodiment will be described.

Figure 2:
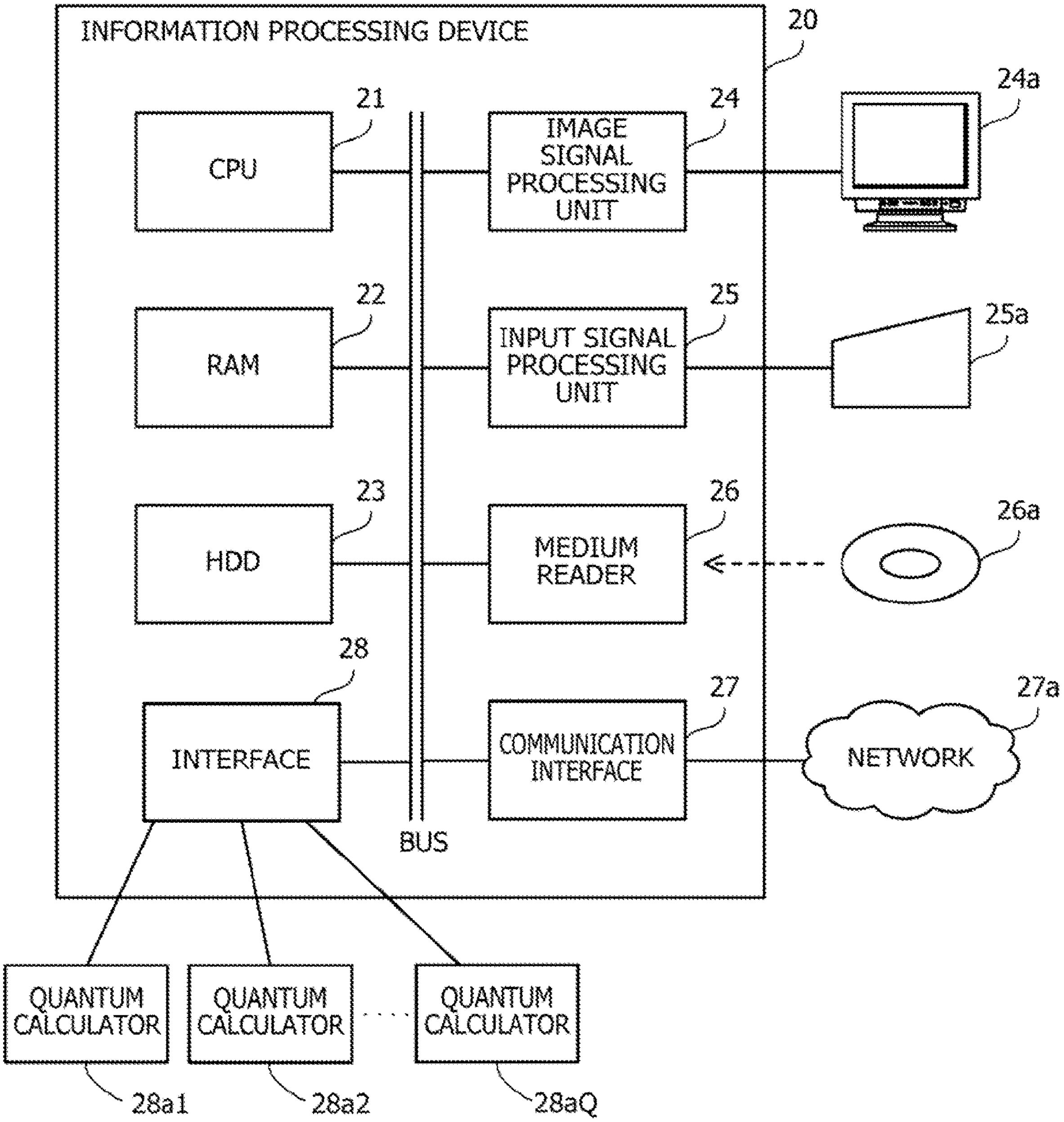
FIG. 2 is a block diagram illustrating a hardware example of the information processing device.

FIG. 2 is a block diagram illustrating a hardware example of the information processing device.

An information processing device 20 includes a CPU 21, a RAM 22, an HDD 23, an image signal processing unit 24, an input signal processing unit 25, a medium reader 26, a communication interface 27, and an interface 28. The units described above are coupled to a bus.

The CPU 21 is a processor including an arithmetic circuit that executes program commands. The CPU 21 loads at least a part of a program and data stored in the HDD 23 into the RAM 22 to execute the program. Note that the CPU 21 may include a plurality of processor cores, the information processing device 20 may include a plurality of processors, and processes described below may be executed in parallel using the plurality of processors or processor cores. In addition, a set of a plurality of processors (multiprocessor) may be called a "processor".

The RAM 22 is a volatile semiconductor memory that temporarily stores a program executed by the CPU 21 and data used by the CPU 21 for arithmetic operations. Note that the information processing device 20 may include a memory of a type other than the RAM and may include a plurality of memories.

The HDD 23 is a nonvolatile storage device that stores programs for software such as an operating system (OS), middleware, or application software and data. The programs include, for example, the quantum calculation control program that controls quantum calculations. Note that the information processing device 20 may include another type of storage device such as a flash memory or a solid state drive (SSD) and may include a plurality of nonvolatile storage devices.

The image signal processing unit 24 outputs an image to a display 24*a* coupled to the information processing device 20 in accordance with a command from the CPU 21. As the display 24*a*, a cathode ray tube (CRT) display, a liquid crystal display (LCD), a plasma display panel (PDP), an organic electro-luminescence (OEL) display, or the like can be used.

The input signal processing unit 25 acquires an input signal from an input device 25*a* coupled to the information processing device 20 and outputs the acquired input signal to the CPU 21. As the input device 25*a*, a pointing device such as a mouse, a touch panel, a touch pad, or a trackball, a keyboard, a remote controller, a button switch, or the like can be used. In addition, a plurality of types of input devices may be coupled to the information processing device 20.

The medium reader 26 is a reading device that reads a program and data recorded on a recording medium 26*a*. As the recording medium 26*a*, for example, a magnetic disk, an optical disc, a magneto-optical disk (MO), a semiconductor memory, or the like can be used. The magnetic disk includes a flexible disk (FD) and an HDD. The optical disc includes a compact disc (CD) and a digital versatile disc (DVD).

The medium reader 26 copies, for example, a program or data read from the recording medium 26*a* to another recording medium such as the RAM 22 or the HDD 23. The read program is executed by, for example, the CPU 21. Note that the recording medium 26*a* may be a portable recording medium and is sometimes used for distribution of a program or data. In addition, the recording medium 26*a* and the HDD 23 will be sometimes referred to as computer-readable recording media.

The communication interface 27 is an interface that is coupled to a network 27*a* and communicates with another information processing device via the network 27*a*. The communication interface 27 may be a wired communication interface coupled by a cable to a communication device such as a switch, or may be a wireless communication interface coupled to a base station by a wireless link.

The interface 28 communicates with quantum calculators 28*a*1, 28*a*2, . . . , and 28*a*Q. The interface 28, for example, transmits various calculation conditions and control signals to the quantum calculators 28*a*1 to 28*a*Q and receives quantum calculation results (quantum states) by the quantum calculators 28*a*1 to 28*a*Q.

Next, functions and processing procedures of the information processing device 20 will be described.

Figure 3:
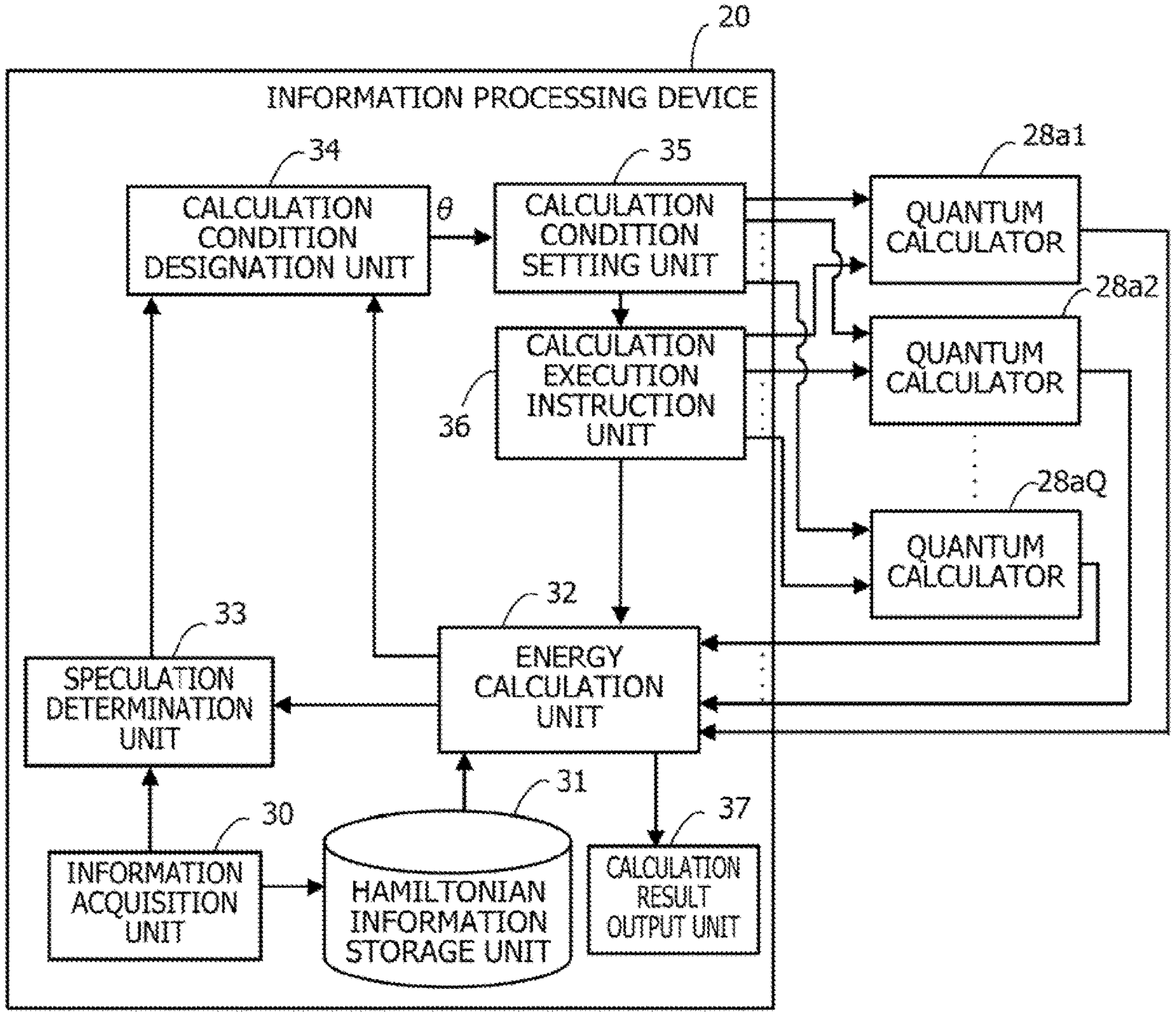
FIG. 3 is a block diagram illustrating a functional example of the information processing device.

FIG. 3 is a block diagram illustrating a functional example of the information processing device.

The information processing device 20 includes an information acquisition unit 30, a Hamiltonian information storage unit 31, an energy calculation unit 32, a speculation determination unit 33, a calculation condition designation unit 34, a calculation condition setting unit 35, a calculation execution instruction unit 36, and a calculation result output unit 37. The Hamiltonian information storage unit 31 can be implemented using, for example, a storage area reserved in the RAM 22 or the HDD 23. The information acquisition unit 30, the energy calculation unit 32, the speculation determination unit 33, the calculation condition designation unit 34, the calculation condition setting unit 35, the calculation execution instruction unit 36, and the calculation result output unit 37 can be implemented using program modules executed by the CPU 21, for example.

The information acquisition unit 30 acquires the calculation accuracy (aforementioned p) input by the user, for example, operating the input device 25*a*, and information on the Hamiltonian (aforementioned $h_i$ illustrated in formula (2)), which is the information on the system subject to calculation.

The Hamiltonian information storage unit 31 stores the information on the Hamiltonian acquired by the information acquisition unit 30.

The energy calculation unit 32 calculates the energy of the system by aforementioned formula (6), based on the quantum states of the system calculated by the quantum calculators **28*a*1 to 28*a*Q, and the information on the Hamiltonian. The energy calculation unit 32 calculates the energy based on the quantum calculation results for the sN (s<1) times or the quantum calculation results for the N times under a certain calculation condition. The current number of calculations is notified by the calculation execution instruction unit 36. Note that the energy calculation unit 32** may calculate the energy based on the quantum calculation results up to that point when the number of calculations is other than n=sN or n=N.

The speculation determination unit 33 determines whether or not the difference between the energy calculated based on the quantum calculation results for the sN times and the energy calculated based on the quantum calculation results for the N times is equal to or less than p. For example, the calculation accuracy acquired by the information acquisition unit 30 is denoted by p.

Based on the energy calculated by the energy calculation unit 32 and the determination result of the speculation determination unit 33, the calculation condition designation unit 34 designates θ representing the calculation conditions for the quantum calculators **28*a*1 to 28*a*Q. For example, the calculation condition designation unit 34** uses simultaneous perturbation stochastic approximation, sequential quadratic programming, or the like to designate θ such that the energy becomes smaller.

The calculation condition setting unit 35 sets θ designated by the calculation condition designation unit 34 in a quantum calculator that is not currently executing calculations among the quantum calculators **28*a*1 to 28*a*Q**.

The calculation execution instruction unit 36 instructs the quantum calculator in which θ is set by the calculation condition setting unit 35 to execute calculations.

The calculation result output unit 37 outputs, for example, the energy of the system obtained after quantum calculations have been executed for predetermined types of calculation conditions, and the applied calculation condition (θ), as a calculation result (search result). The calculation result output unit 37 may output the calculation result to the display **24*a* for display, or may transmit the calculation result to another information processing device via the network 27*a*. In addition, the calculation result output unit 37 may store the calculation result in a storage device such as the HDD 23**.

Figure 4:
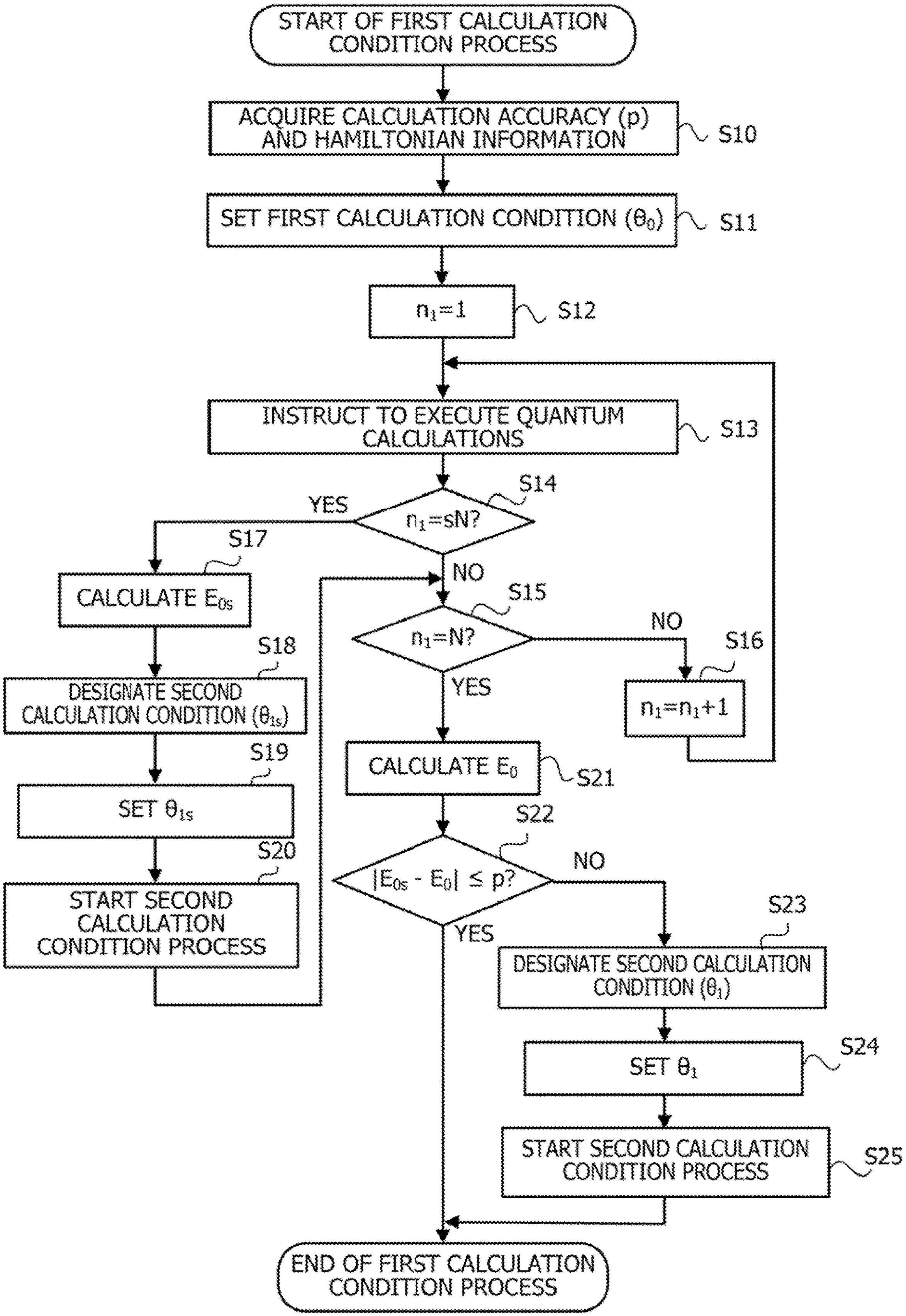
FIG. 4 is a flowchart illustrating an example of the processing procedure of the quantum calculation control method (part 1)
Figure 5:
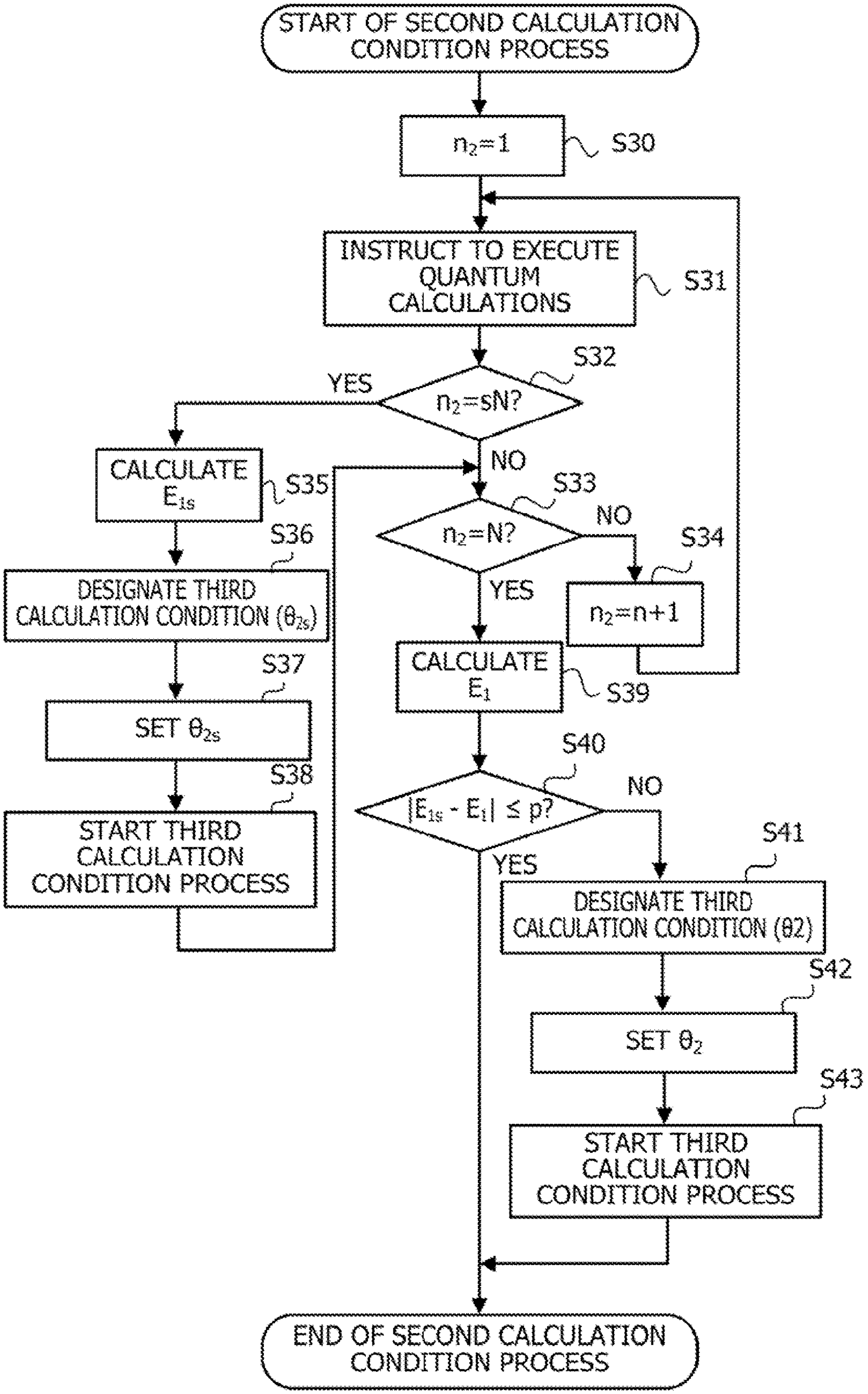
FIG. 5 is a flowchart illustrating an example of the processing procedure of the quantum calculation control method (part 2)
Figure 6:
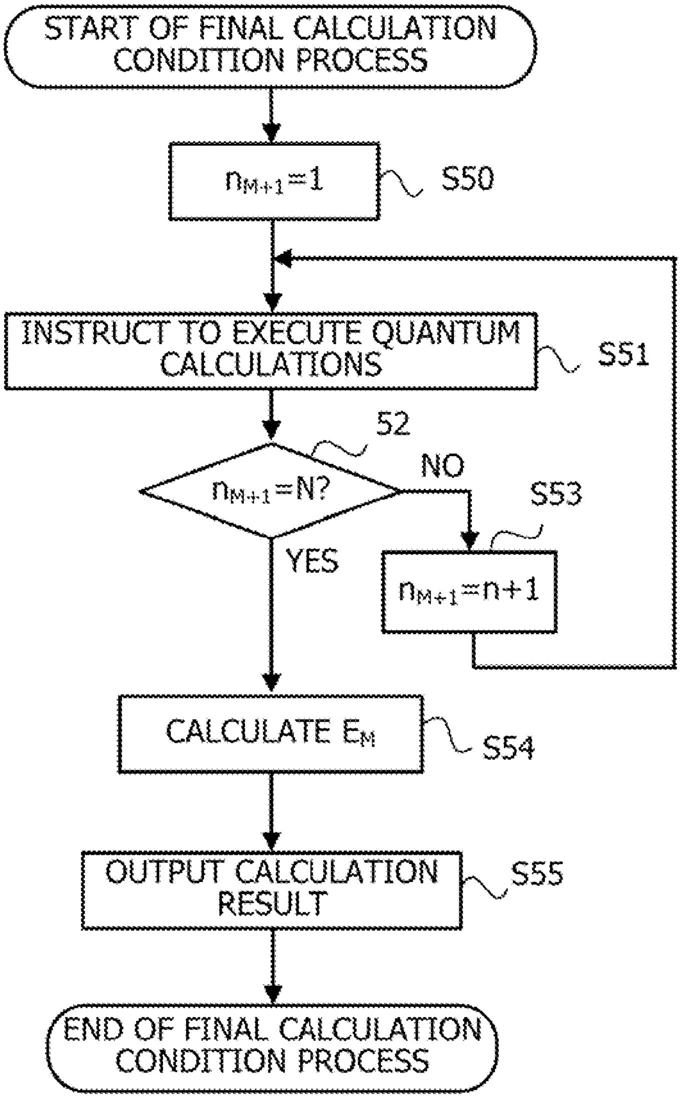
FIG. 6 is a flowchart illustrating an example of the processing procedure of the quantum calculation control method (part 3)

FIGS. 4, 5, and 6 are flowcharts illustrating an example of the processing procedure of the quantum calculation control method. FIG. 4 illustrates an example of control when the quantum calculator is caused to perform quantum calculations under the first calculation condition.

First, the information acquisition unit 30 acquires the calculation accuracy (p) input by the user, for example, operating the input device **25*a*, and the information on the Hamiltonian (step S10**).

The calculation condition setting unit 35 sets $\theta_0$, which is the initial value of θ, as the first calculation condition in one of the quantum calculators **28*a*1 to 28*a*Q (step S11**).

The calculation execution instruction unit 36 initializes a variable $n_1$ indicating the number of iterations of quantum calculations under the first calculation condition to one (step S12) and instructs the quantum calculator in which $\theta_0$ is set to execute quantum calculations (step S13). This ensures that the quantum calculation for one time according to $\theta_0$ is executed.

The calculation execution instruction unit 36 determines whether or not $n_1$=sN is met (step S14). When determining that $n_1$=sN is not met, the calculation execution instruction unit 36 determines whether or not $n_1$=N is met (step S15).

When determining that $n_1$=N is not met, the calculation execution instruction unit 36 sets $n_1=n_1+1$ (step S16) and repeats the process from step S13.

When the calculation execution instruction unit 36 determines that $n_1$=sN is met in the process in step S14, the energy calculation unit 32 calculates $E_{0s}$ by aforementioned formula (6) (step S17). The energy calculation unit 32 calculates the probability ($p_{i0}$) that the number of quantum bits in the state |1> in the aforementioned quantum calculation per one time is an even number, for example, based on the quantum calculation results for $n_1$=sN times, and uses $p_{i0}$ to calculate $E_{0s}$ as E in formula (6).

After the process in step S17, the calculation condition designation unit 34 designates $\theta_{1s}$ as the second calculation condition, based on $E_{0s}$ (step S18). Then, the calculation condition setting unit 35 sets $\theta_{1s}$ in a quantum calculator that is not currently executing calculations among the quantum calculators **28*a*1 to 28*a*Q (step S19). Thereafter, although the process of the second calculation condition illustrated in FIG. 5 is started (step S20), the process of the first calculation condition is continued, and the process from step S15** is repeated.

When the calculation execution instruction unit 36 determines that $n_1$=N is met in the process in step S15, the energy calculation unit 32 calculates $E_0$ by aforementioned formula (6) (step S21). The energy calculation unit 32 calculates $p_{i0}$ based on the quantum calculation results for $n_1$=N times and uses $p_{i0}$ to calculate $E_0$ as E in formula (6).

After the process in step S21, the speculation determination unit 33 determines whether or not $|E_{0s}-E_0|$, which is the difference between $E_{0s}$ and $E_0$, is equal to or less than p (step S22).

When the speculation determination unit 33 determines that $|E_{0s}-E_0|$ is not equal to or less than p, the calculation condition designation unit 34 designates $\theta_1$ to be used as the second calculation condition instead of aforementioned $\theta_{1s}$, based on $E_0$ (step S23). Then, the calculation condition setting unit 35 sets $\theta_1$ instead of $\theta_{1s}$ in the quantum calculator in which $\theta_{1s}$ has been set (step S24). Thereafter, the process of the second calculation condition is started (step S25).

When the speculation determination unit 33 determines that $|E_{0s}-E_0|$ is equal to or less than p in the process in step S22, or after the process in step S25, the process of the first calculation condition ends.

FIG. 5 illustrates an example of control when the quantum calculator is caused to perform calculations under the second calculation condition.

The calculation execution instruction unit 36 initializes a variable $n_2$ indicating the number of iterations of quantum calculations under the second calculation condition to one (step S30) and instructs the quantum calculator in which $\theta_1$ or $\theta_{1s}$ is set to execute quantum calculations (step S31). This ensures that the quantum calculation for one time according to $\theta_1$ or $\theta_{1s}$ is executed.

The calculation execution instruction unit 36 determines whether or not $n_2$=sN is met (step S32). When determining that $n_2$=sN is not met, the calculation execution instruction unit 36 determines whether or not $n_2$=N is met (step S33).

When determining that $n_2$=N is not met, the calculation execution instruction unit 36 sets $n_2=n_2+1$ (step S34) and repeats the process from step S31.

When the calculation execution instruction unit 36 determines that $n_2$=sN is met in the process in step S32, the energy calculation unit 32 calculates $E_{1s}$ by aforementioned formula (6) (step S35). The energy calculation unit 32 calculates aforementioned $p_{i0}$ based on the quantum calculation results for $n_2$=sN times according to $\theta_1$ or $\theta_{1s}$ and uses $p_{i0}$ to calculate $E_{1s}$ as E in formula (6).

After the process in step S35, the calculation condition designation unit 34 designates $\theta_{2s}$ as the third calculation condition, based on $E_{1s}$ (step S36). Then, the calculation condition setting unit 35 sets $\theta_{2s}$ in a quantum calculator that is not currently executing calculations among the quantum calculators 28*a*1 to 28*a*Q (step S37). Thereafter, although the process of the third calculation condition is started (step S38), the process of the second calculation condition is continued, and the process from step S33 is repeated.

When the calculation execution instruction unit 36 determines that $n_2$=N is met in the process in step S33, the energy calculation unit 32 calculates $E_1$ by aforementioned formula (6) (step S39). The energy calculation unit 32 calculates $p_{i0}$ based on the quantum calculation results for $n_2$=N times and uses $p_{i0}$ to calculate $E_1$ as E in formula (6).

After the process in step S39, the speculation determination unit 33 determines whether or not $|E_{1s}-E_1|$, which is the difference between $E_{1s}$ and $E_1$, is equal to or less than p (step S40).

When the speculation determination unit 33 determines that $|E_{1s}-E_1|$ is not equal to or less than p, the calculation condition designation unit 34 designates $\theta_2$ to be used as the third calculation condition instead of aforementioned $\theta_{2s}$, based on $E_1$ (step S41). Then, the calculation condition setting unit 35 sets $\theta_2$ instead of $\theta_{2s}$ in the quantum calculator in which $\theta_{2s}$ has been set (step S42). Thereafter, the process of the third calculation condition is started (step S43).

When the speculation determination unit 33 determines that $|E_{1s}-E_1|$ is equal to or less than p in the process in step S40, or after the process in step S43, the process of the second calculation condition ends.

The process after the third calculation condition is also performed similarly to the process in FIG. 5. However, regarding the final calculation condition, for example, the process as illustrated in FIG. 6 is performed.

FIG. 6 illustrates an example of control when the quantum calculator is caused to perform calculations under the final calculation condition. When M+1 types of calculation conditions ($\theta_0$ to $\theta_M$) are used, the final calculation condition is $\theta_M$.

The calculation execution instruction unit 36 initializes a variable $n_{M+1}$ indicating the number of iterations of quantum calculations under the final calculation condition to one (step S50) and instructs the quantum calculator in which $\theta_M$ or $\theta_{Ms}$ is set to execute quantum calculations (step S51). This ensures that the quantum calculation for one time according to $\theta_M$ or $\theta_{Ms}$ is executed.

The calculation execution instruction unit 36 determines whether or not $n_{M+1}$=N is met (step S52). When determining that $n_{M+1}$=N is not met, the calculation execution instruction unit 36 sets $n_{M+1}=n_{M+1}+1$ (step S53) and repeats the process from step S51.

When the calculation execution instruction unit 36 determines that $n_{M+1}$=N is met in the process in step S52, the energy calculation unit 32 calculates $E_M$ by aforementioned formula (6) (step S54). The energy calculation unit 32 calculates $p_{i0}$ based on the quantum calculation results for $n_{M+1}$=N times according to $\theta_M$ or $\theta_{Ms}$ and uses $p_{i0}$ to calculate $E_M$ as E in formula (6).

After the process in step S54, the calculation result output unit 37 outputs the calculation result (step S55). This completes the process of the final calculation condition. The calculation result output unit 37, for example, outputs the applied calculation condition ($\theta_M$ or $\theta_{MS}$) as the calculation result, as well as $E_M$ calculated in the process in step S54.

Note that, when quantum chemical calculations are performed, the process as described above is performed for each of aforementioned R, which are interatomic distances or intermolecular distances.

Note that the orders of processes illustrated in FIGS. 4 to 6 are examples, and the orders of processes may be appropriately changed.

Before describing the effects of the above quantum calculation control method, the following comparative example will be described in which the processes for each calculation condition are performed not speculatively but in series.

Comparative Example

Figure 7:
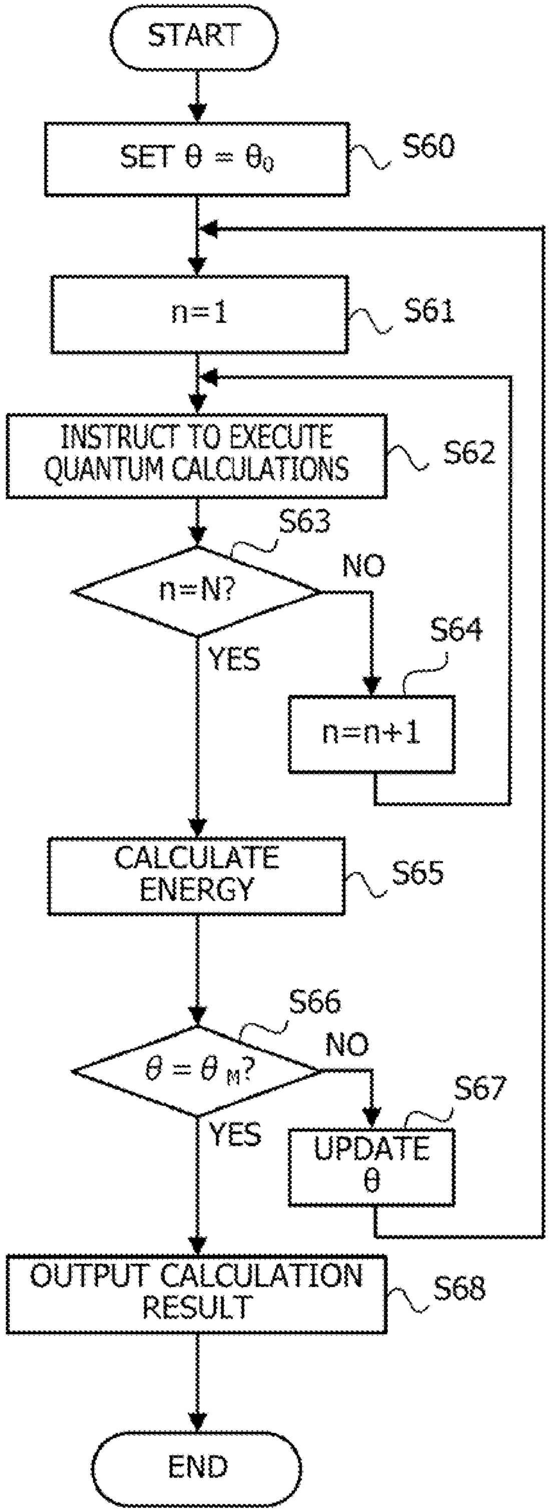
FIG. 7 is a flowchart illustrating a processing procedure of a quantum calculation control method of a comparative example.

FIG. 7 is a flowchart illustrating a processing procedure of a quantum calculation control method of the comparative example.

In a quantum calculation control process of the comparative example, first, $\theta_0$, which is the initial value of θ, which is a calculation condition, is set in a quantum calculator (step S60), a variable n indicating the number of iterations of quantum calculations is initialized to one (step S61), and the quantum calculator is instructed to execute quantum calculations (step S62). This ensures that the quantum calculation for one time is executed.

Thereafter, it is determined whether or not n=N is met (step S63), and when it is determined that n=N is not met, n=n+1 is set (step S64), and the process from step S62 is repeated.

When it is determined that n=N is met, E represented by formula (6) is calculated based on the quantum calculation results for n=N times (step S65). Thereafter, it is determined whether or not the calculation condition is the final calculation condition ($\theta=\theta_M$ in the example in FIG. 7) (step S66).

When it is determined that the calculation condition is not the final calculation condition, θ is updated based on E calculated in the process in step S65 (step S67), the process from step S61 is repeated, and the process of a new calculation condition is performed.

In the process in step S66, when it is determined that the calculation condition is the final calculation condition, the calculation result is output (step S68), and the quantum calculation control process ends.

Figure 8:
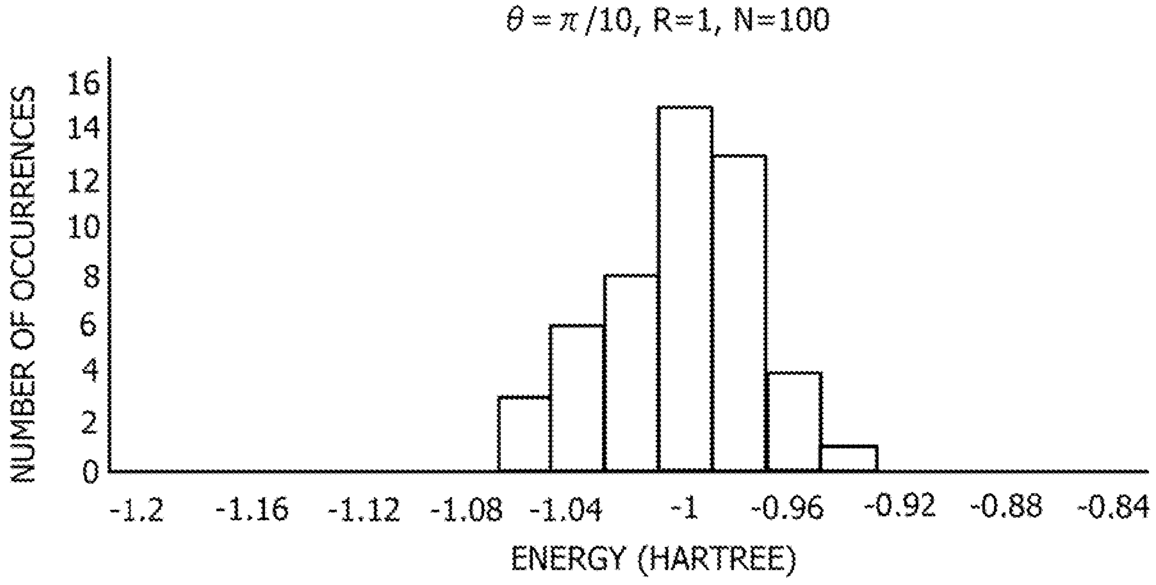
FIG. 8 is a diagram illustrating an exemplary relationship between the number of iterations of calculations and the energy calculation accuracy (part 1)
Figure 9:
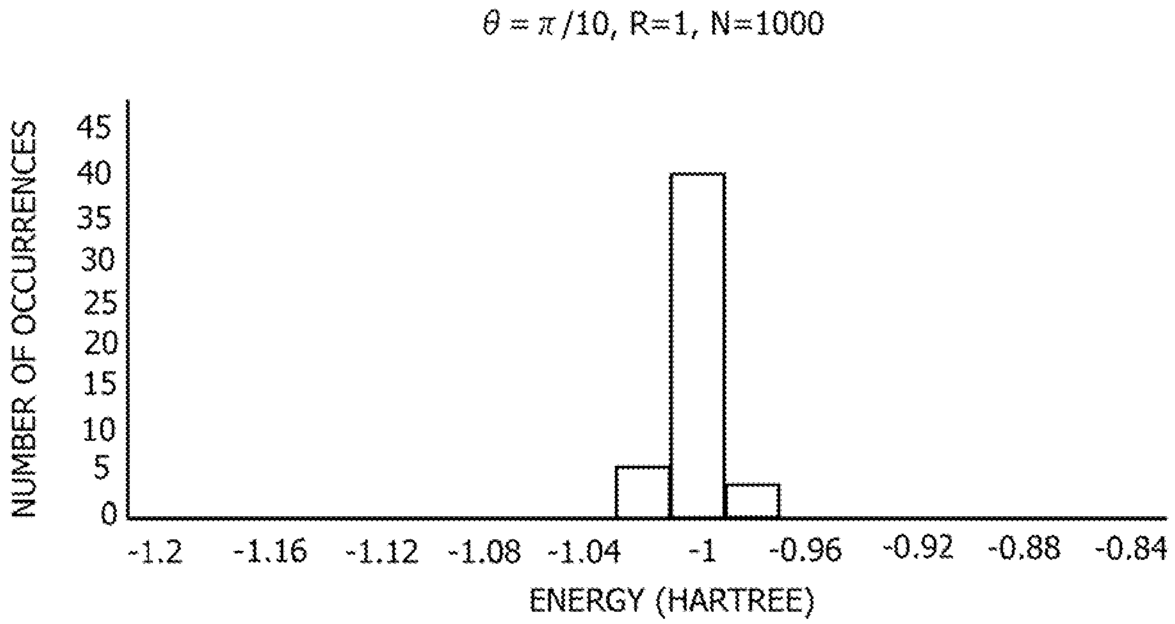
FIG. 9 is a diagram illustrating an exemplary relationship between the number of iterations of calculations and the energy calculation accuracy (part 2)

FIGS. 8 and 9 are diagrams illustrating an exemplary relationship between the number of iterations of calculations and the energy calculation accuracy. FIGS. 8 and 9 illustrate an example in which the energy of a hydrogen molecule when θ=π/10 is used as a calculation condition and R, which is the intermolecular distance, is set to one was calculated by simulation. In FIG. 8, N, which is the number of iterations, is assumed as 100, and in FIG. 9, N is assumed as 1000. The horizontal axis indicates the energy (in units of hartree), and the vertical axis indicates the calculated number of occurrences of each energy.

As in FIG. 8, in the case of N=100, a large error occurs with respect to the known correct answer (energy=−0.99 hartree) under the above calculation conditions. As in FIG. 9, when N=1000 is employed, the error becomes smaller.

It is known that N=20000 or so is employed in order to obtain a calculation result with an energy standard deviation of $1.6\times10^{-3}$ hartree, which is an example of the accuracy demanded in quantum chemical calculations.

Since the process of each calculation condition is repeated many times as described above, when the aforementioned quantum calculation control method of the comparative example, in which the processes under a plurality of calculation conditions are performed in series, is applied, the calculation time will become longer.

Figure 10:
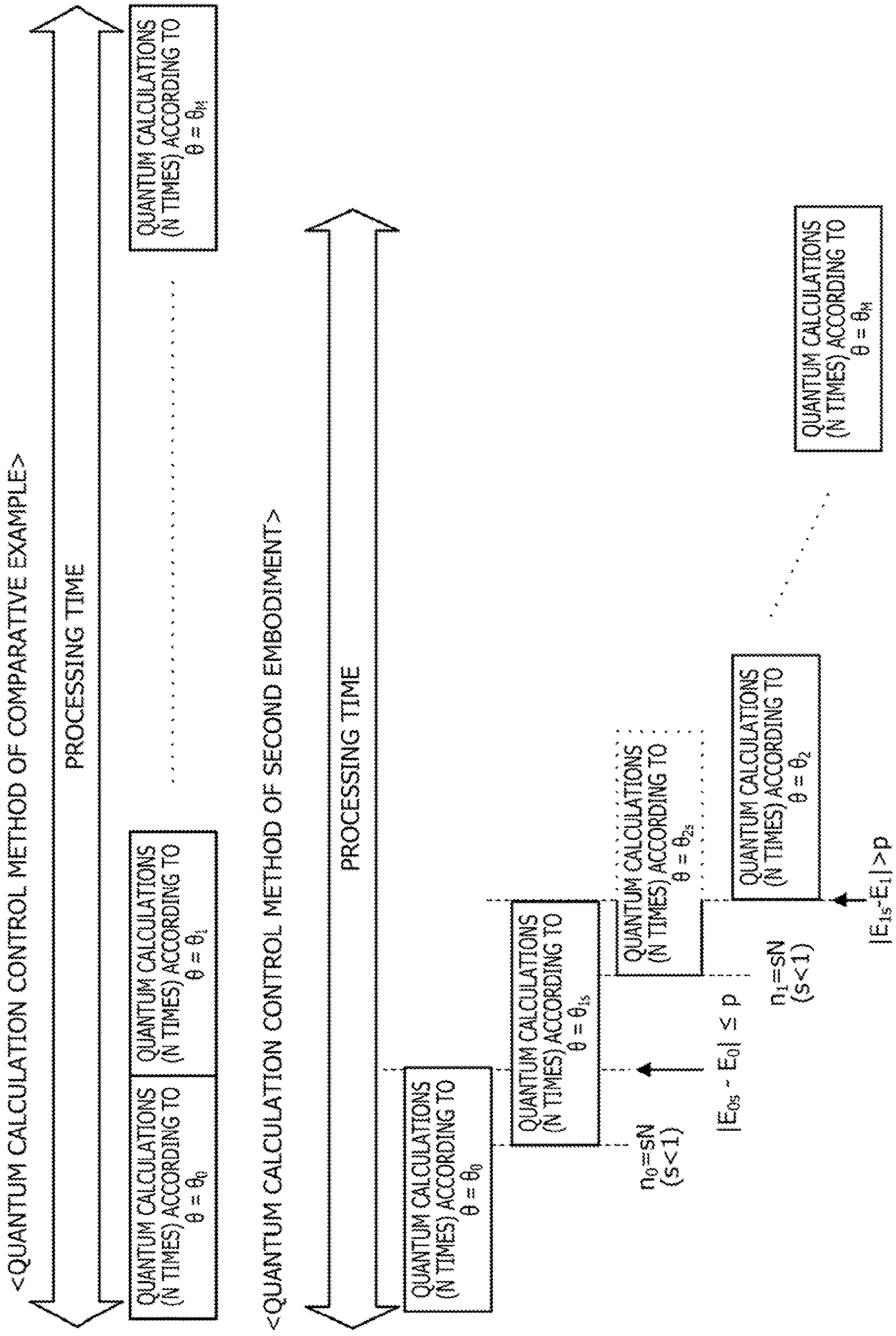
FIG. 10 is a diagram illustrating the difference in processing time of the quantum calculation control methods between a second embodiment and the comparative example.

FIG. 10 is a diagram illustrating the difference in processing time of the quantum calculation control methods between the second embodiment and the comparative example. The example in FIG. 10 illustrates examples of control each for causing quantum calculations to be performed according to M+1 types of calculation conditions.

In the quantum calculation control method of the comparative example, quantum calculations according to each of $\theta=\theta_0$ to $\theta_M$, which represents M+1 types of calculation conditions, are performed N times in series.

In contrast to this, in the quantum calculation control method of the second embodiment, the speculative processing is performed. In the example in FIG. 10, quantum calculations according to $\theta=\theta_{1s}$ are started during quantum calculations for the N times according to $\theta=\theta_0$ (when $n_0=sN$ is met). In addition, since $|E_{0s}-E_0|$ is equal to or less than p when $n_0=N$ is met, quantum calculations according to $\theta=\theta_{1s}$ are continued.

Furthermore, during quantum calculations for the N times according to $\theta=\theta_{1s}$ (when $n_1=sN$ is met), quantum calculations according to $\theta=\theta_{2s}$ are started. In the example in FIG. 10, since $|E_{1s}-E_1|$ is greater than p when $n_1=N$ is met, quantum calculations according to $\theta=\theta_{2s}$ are suspended, and quantum calculations according to $\theta=\theta_2$ are started.

In the quantum calculation control method of the second embodiment, if the case where $|E_{1s}-E_i|\leq p$ (i is an integer from zero to M) is met (the case where speculation is successful) occurs even once, the processing time until quantum calculations under the final calculation condition ($\theta=\theta_M$) is finished may be reduced compared with the quantum calculation control method of the comparative example.

(Example of Simulation Results)

Figure 11:
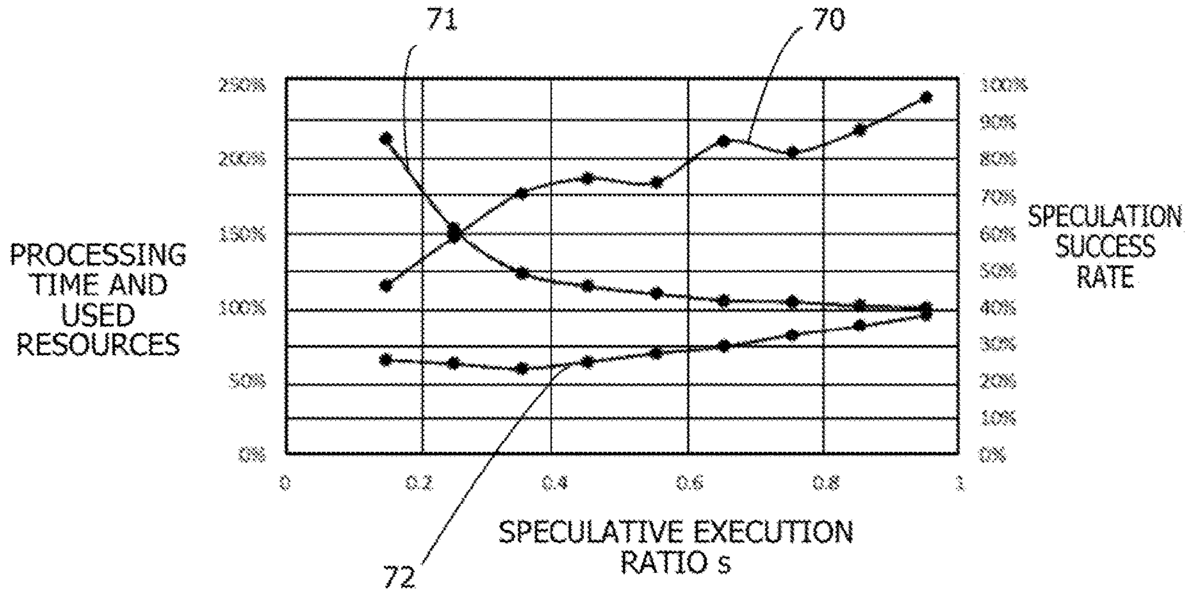
FIG. 11 is a diagram illustrating an example of simulation results.

FIG. 11 is a diagram illustrating an example of simulation results. The horizontal axis represents the speculative execution ratio s, the left vertical axis represents the processing time and used resources when the speculative execution ratio s=1 is assumed to be 100% (the number of quantum calculators×quantum calculation execution time), and the right vertical axis represents the speculation success rate.

Note that, for simplicity of calculation, FIG. 11 illustrates a calculation example when N=100 and p=0.1 are assumed, and θ is not designated from the energy but defined in advance as $\theta_0=0\times\pi/10$, $\theta_1=1\times\pi/10$, . . . , and $\theta_9=9\times\pi/10$.

A simulation result 70 indicates the speculation success rate with respect to the speculative execution ratio s (the percentage that it is determined that $|E_{is}-E_i|\leq p$ is met), and a simulation result 71 indicates the used resources with respect to the speculative execution ratio s. A simulation result 72 indicates the processing time with respect to the speculative execution ratio s.

When the speculative execution ratio s is made smaller, the used resources indicated by the simulation result 71 increases due to a decrease in the speculation success rate indicated by the simulation result 70. However, as in the simulation result 72, it can be seen that the processing time tends to be shortened when the speculative execution ratio s is made smaller.

Note that, as mentioned above, the processing contents described above can be achieved by causing the information processing device 20 to execute a program.

The program can be recorded in a computer-readable recording medium (such as the recording medium 26*a*). As the recording medium, for example, a magnetic disk, an optical disc, a magneto-optical disk, a semiconductor memory, or the like can be used. The magnetic disk includes an FD and an HDD. The optical disc includes a CD, a CD-recordable (R)/rewritable (RW), a DVD, and a DVD-R/RW. The program is sometimes recorded in a portable recording medium and distributed. In that case, the program may be copied from the portable recording medium to another recording medium (such as the HDD 23) and then executed.

The above description merely indicates the principle of the present invention. Furthermore, numerous modifications and alterations can be made by those skilled in the art. The present invention is not limited to the exact configuration and application examples illustrated and described above, and all corresponding modifications and equivalents are regarded within the scope of the present invention according to appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a quantum calculation control program comprising instructions which, when executed by a computer having a plurality of quantum calculators each configured to calculate a quantum state of a system, cause the computer to execute processing, the processing comprising:

causing a first quantum calculator among the plurality of quantum calculators to repeat calculation of the quantum state under a first calculation condition a first number of times;

acquiring first energy of the system, based on information on the system and a result of the calculation of the first quantum calculator for a second number of times less than the first number of times;

causing a second quantum calculator among the plurality of quantum calculators to start calculation of the quantum state under a second calculation condition determined based on the first energy, during the calculation under the first calculation condition;

acquiring second energy of the system, based on the information and a result of the calculation of the first quantum calculator for the first number of times; and when a difference between the first energy and the second energy is equal to or less than a value, causing the second quantum calculator to continue the calculation under the second calculation condition until a number of calculations reaches the first number of times.

2. The non-transitory computer-readable storage medium according to claim 1, wherein the process further comprising when the difference is greater than the value, causing the second quantum calculator to suspend the calculation under the second calculation condition and to start calculation under a third calculation condition determined based on the second energy.

3. The non-transitory computer-readable storage medium according to claim 1, wherein the value is calculation accuracy.

4. A quantum calculation control method for a computer having a plurality of quantum calculators each configured to calculate a quantum state of a system, the quantum calculation control method comprising:

causing a first quantum calculator among the plurality of quantum calculators to repeat calculation of the quantum state under a first calculation condition a first number of times;

acquiring first energy of the system, based on information on the system and a result of the calculation of the first quantum calculator for a second number of times less than the first number of times;

causing a second quantum calculator among the plurality of quantum calculators to start calculation of the quantum state under a second calculation condition determined based on the first energy, during the calculation under the first calculation condition;

acquiring second energy of the system, based on the information and a result of the calculation of the first quantum calculator for the first number of times; and when a difference between the first energy and the second energy is equal to or less than a value, causing the second quantum calculator to continue the calculation under the second calculation condition until a number of calculations reaches the first number of times.

5. The quantum calculation control method according to claim 4, wherein the quantum calculation control method further comprising when the difference is greater than the value, causing the second quantum calculator to suspend the calculation under the second calculation condition and to start calculation under a third calculation condition determined based on the second energy.

6. The quantum calculation control method according to claim 4, wherein the value is calculation accuracy.

7. An information processing device comprising:

one or more memories;

a plurality of quantum calculators each configured to calculate a quantum state of a system, and one or more processors coupled to the one or more memories and the plurality of quantum calculators, the one or more processors being configured to:

cause a first quantum calculator among the plurality of quantum calculators to repeat calculation of the quantum state under a first calculation condition a first number of times, acquire first energy of the system, based on information on the system and a result of the calculation of the first quantum calculator for a second number of times less than the first number of times, cause a second quantum calculator among the plurality of quantum calculators to start calculation of the quantum state under a second calculation condition determined based on the first energy, during the calculation under the first calculation condition, acquire second energy of the system, based on the information and a result of the calculation of the first quantum calculator for the first number of times, and when a difference between the first energy and the second energy is equal to or less than a value, cause the second quantum calculator to continue the calculation under the second calculation condition until a number of calculations reaches the first number of times.

8. The information processing device according to claim 7, wherein the one or more processors are further configured to when the difference is greater than the value, cause the second quantum calculator to suspend the calculation under the second calculation condition and to start calculation under a third calculation condition determined based on the second energy.

9. The information processing device according to claim 7, wherein the value is calculation accuracy.

* * * * *